United States Patent
Janssen et al.

(10) Patent No.: US 8,034,286 B2
(45) Date of Patent: *Oct. 11, 2011

(54) ULTRASONIC TREATMENT SYSTEM FOR SEPARATING COMPOUNDS FROM AQUEOUS EFFLUENT

(75) Inventors: Robert Allen Janssen, Alpharetta, GA (US); Earl C. McCraw, Jr., Duluth, GA (US); Kimberlee Fay Thompson, Atlanta, GA (US); John Gavin MacDonald, Decatur, GA (US); Thomas David Ehlert, Neenah, WI (US); Patrick Sean McNichols, Hortonville, WI (US); John Glen Ahles, Neenah, WI (US); Paul Warren Rasmussen, Neenah, WI (US); Steve Roffers, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 1120 days.

This patent is subject to a terminal disclaimer.

(21) Appl. No.: 11/530,183

(22) Filed: Sep. 8, 2006

(65) Prior Publication Data
US 2008/0061000 A1  Mar. 13, 2008

(51) Int. Cl.
*C02F 1/28* (2006.01)
*C02F 1/36* (2006.01)
(52) U.S. Cl. ............ 422/20; 210/748.01; 210/663; 210/748.02; 210/748.03
(58) Field of Classification Search .......... 210/663, 210/748.01–748.1; 422/22, 23, 24, 222, 422/186–186.04, 20
See application file for complete search history.

(56) References Cited

U.S. PATENT DOCUMENTS

| | | | |
|---|---|---|---|
| 2,115,056 A | 4/1938 | Samuel | |
| 2,307,206 A | 1/1943 | Fischer | |
| 2,584,053 A | 1/1952 | Seavey et al. | |
| 2,620,894 A | 12/1952 | Peterson et al. | |
| 2,661,192 A | 12/1953 | Horsley et al. | |
| 2,946,981 A | 7/1960 | O'Neill | |
| 3,066,232 A * | 11/1962 | Branson | 310/325 |
| 3,160,138 A | 12/1964 | Platzman | |
| 3,202,281 A | 8/1965 | Weston | |
| 3,239,998 A | 3/1966 | Carter et al. | |
| 3,246,881 A | 4/1966 | Davidson et al. | |
| 3,249,453 A | 5/1966 | Schnoring et al. | |
| 3,273,631 A | 9/1966 | Neuman | |
| 3,275,787 A | 9/1966 | Newberry | |

(Continued)

FOREIGN PATENT DOCUMENTS

CA    2175065    5/1995

(Continued)

OTHER PUBLICATIONS

Non-final office action regarding U.S. Appl. No. 11/530,311, dated Nov. 5, 2008.

(Continued)

*Primary Examiner* — Nam Nguyen
*Assistant Examiner* — Cameron J Allen
(74) *Attorney, Agent, or Firm* — Armstrong Teasdale LLP

(57) ABSTRACT

Novel ultrasonic treatment systems for separating compounds in an aqueous effluent and processes for using the ultrasonic treatment systems are disclosed. More particularly, the ultrasonic treatment systems use ultrasonic energy to energize adsorbent to provide efficient and effective removal of compounds from aqueous effluents, such as textile effluents.

37 Claims, 6 Drawing Sheets

U.S. PATENT DOCUMENTS

| | | |
|---|---|---|
| 3,278,165 A | 10/1966 | Gaffney |
| 3,284,991 A | 11/1966 | Ploeger et al. |
| 3,325,348 A | 6/1967 | Bennett |
| 3,326,470 A | 6/1967 | Loudin et al. |
| 3,338,992 A | 8/1967 | Kinney |
| 3,341,394 A | 9/1967 | Kinney |
| 3,425,951 A | 2/1969 | Ishiwata |
| 3,463,321 A | 8/1969 | VanIngen |
| 3,479,873 A | 11/1969 | Hermanns |
| 3,490,584 A | 1/1970 | Balamuth |
| 3,502,763 A | 3/1970 | Hartman |
| 3,519,251 A | 7/1970 | Hammitt et al. |
| 3,542,345 A | 11/1970 | Kuris |
| 3,542,615 A | 11/1970 | Dobo et al. |
| 3,567,185 A | 3/1971 | Ross et al. |
| 3,591,946 A | 7/1971 | Loe |
| 3,664,191 A | 5/1972 | Hermanns |
| 3,692,618 A | 9/1972 | Dorschner et al. |
| 3,782,547 A | 1/1974 | Dieter |
| 3,802,817 A | 4/1974 | Matsuki et al. |
| 3,865,350 A | 2/1975 | Burtis |
| 3,873,071 A | 3/1975 | Tatebe |
| 3,904,392 A | 9/1975 | VanIngen et al. |
| 4,035,151 A | 7/1977 | Czerny et al. |
| 4,062,768 A | 12/1977 | Elliot |
| 4,070,167 A | 1/1978 | Barbee et al. |
| 4,122,797 A | 10/1978 | Kawamura et al. |
| 4,168,295 A | 9/1979 | Sawyer |
| 4,218,221 A | 8/1980 | Cottell |
| 4,249,986 A | 2/1981 | Obeda |
| 4,259,021 A | 3/1981 | Goudy, Jr. |
| 4,260,389 A | 4/1981 | Lister |
| 4,266,879 A | 5/1981 | McFall |
| 4,340,563 A | 7/1982 | Appel et al. |
| 4,372,296 A | 2/1983 | Fahim |
| 4,398,925 A | 8/1983 | Trinh et al. |
| 4,425,718 A | 1/1984 | Kawaguchi |
| 4,511,254 A | 4/1985 | North et al. |
| 4,556,467 A | 12/1985 | Kuhn |
| 4,612,016 A | 9/1986 | Jaeger et al. |
| 4,612,018 A | 9/1986 | Tsuboi et al. |
| 4,663,220 A | 5/1987 | Wisneski et al. |
| 4,673,512 A | 6/1987 | Schram |
| 4,693,879 A | 9/1987 | Yoshimura et al. |
| 4,699,636 A | 10/1987 | Bofinger et al. |
| 4,706,509 A | 11/1987 | Riebel |
| 4,708,878 A | 11/1987 | Hagelauer et al. |
| 4,726,522 A | 2/1988 | Kokubo et al. |
| 4,743,361 A | 5/1988 | Schram |
| 4,848,159 A | 7/1989 | Kennedy et al. |
| 4,877,516 A | 10/1989 | Schram |
| 4,879,011 A | 11/1989 | Schram |
| 4,929,279 A | 5/1990 | Hays |
| RE33,524 E | 1/1991 | Schram |
| 4,983,045 A | 1/1991 | Taniguchi |
| 5,006,266 A | 4/1991 | Schram |
| 5,026,167 A | 6/1991 | Berliner, III |
| 5,032,027 A | 7/1991 | Berliner, III |
| 5,059,249 A | 10/1991 | Hays |
| 5,096,532 A | 3/1992 | Neuwirth et al. |
| 5,110,403 A | 5/1992 | Ehlert |
| 5,122,165 A | 6/1992 | Wang et al. |
| 5,164,094 A | 11/1992 | Stuckart |
| 5,169,067 A | 12/1992 | Matsusaka et al. |
| 5,242,557 A | 9/1993 | Jones et al. |
| 5,258,413 A | 11/1993 | Isayev |
| 5,269,297 A | 12/1993 | Weng et al. |
| 5,326,164 A | 7/1994 | Logan |
| 5,330,100 A | 7/1994 | Malinowski |
| 5,335,449 A | 8/1994 | Beatty |
| 5,372,634 A | 12/1994 | Monahan |
| 5,373,212 A | 12/1994 | Beau |
| 5,375,926 A | 12/1994 | Omasa |
| 5,391,000 A | 2/1995 | Taniguchi |
| 5,466,722 A | 11/1995 | Stoffer et al. |
| 5,519,670 A | 5/1996 | Walter |
| 5,536,921 A | 7/1996 | Herdrick et al. |
| 5,583,292 A | 12/1996 | Karbach et al. |
| 5,585,565 A | 12/1996 | Glascock et al. |
| 5,665,383 A | 9/1997 | Grinstaff et al. |
| 5,681,457 A | 10/1997 | Mahoney |
| 5,711,888 A | 1/1998 | Trampler et al. |
| 5,770,124 A | 6/1998 | Marecki et al. |
| 5,803,270 A | 9/1998 | Brodeur |
| 5,810,037 A | 9/1998 | Sasaki et al. |
| 5,831,166 A | 11/1998 | Kozuka et al. |
| 5,853,456 A | 12/1998 | Bryan et al. |
| 5,868,153 A | 2/1999 | Cohen et al. |
| 5,873,968 A | 2/1999 | Pike et al. |
| 5,902,489 A | 5/1999 | Yasuda et al. |
| 5,916,203 A | 6/1999 | Brandon et al. |
| 5,922,355 A | 7/1999 | Parikh et al. |
| 5,935,883 A | 8/1999 | Pike |
| 5,937,906 A | 8/1999 | Kozyuk |
| 5,964,926 A | 10/1999 | Cohen |
| 5,979,664 A | 11/1999 | Brodeur |
| 6,010,592 A | 1/2000 | Jameson et al. |
| 6,020,277 A | 2/2000 | Jameson |
| 6,035,897 A | 3/2000 | Kozyuk |
| 6,053,028 A | 4/2000 | Kraus, Jr. et al. |
| 6,053,424 A | 4/2000 | Gipson et al. |
| 6,055,859 A | 5/2000 | Kozuka et al. |
| 6,060,416 A | 5/2000 | Kobata |
| 6,074,466 A | 6/2000 | Iwasa |
| 6,090,731 A | 7/2000 | Pike et al. |
| 6,106,590 A | 8/2000 | Ueno et al. |
| 6,169,045 B1 | 1/2001 | Pike et al. |
| 6,200,486 B1 | 3/2001 | Chahine et al. |
| 6,218,483 B1 | 4/2001 | Muthiah et al. |
| 6,221,258 B1 | 4/2001 | Feke et al. |
| 6,254,787 B1 | 7/2001 | Kimura et al. |
| 6,266,836 B1 | 7/2001 | Juarez et al. |
| 6,315,215 B1 | 11/2001 | Gipson et al. |
| 6,322,240 B1 | 11/2001 | Omasa |
| 6,332,541 B1 | 12/2001 | Coakley et al. |
| 6,361,697 B1 | 3/2002 | Coury et al. |
| 6,368,414 B1 | 4/2002 | Johnson |
| 6,380,264 B1 | 4/2002 | Jameson et al. |
| 6,383,301 B1 | 5/2002 | Bell et al. |
| 6,450,417 B1 | 9/2002 | Gipson et al. |
| 6,467,350 B1 | 10/2002 | Kaduchak et al. |
| 6,482,327 B1 | 11/2002 | Mori et al. |
| 6,506,584 B1 | 1/2003 | Chandler et al. |
| 6,547,903 B1 | 4/2003 | McNichols et al. |
| 6,547,935 B2 | 4/2003 | Scott |
| 6,547,951 B1 | 4/2003 | Maekawa |
| 6,551,607 B1 | 4/2003 | Minerath, III |
| 6,576,042 B2 | 6/2003 | Kraus et al. |
| 6,582,611 B1 | 6/2003 | Kerfoot |
| 6,593,436 B2 | 7/2003 | Austin et al. |
| 6,605,252 B2 | 8/2003 | Omasa |
| 6,620,226 B2 | 9/2003 | Hutton et al. |
| 6,624,100 B1 | 9/2003 | Pike et al. |
| 6,627,265 B2 | 9/2003 | Kutilek |
| 6,655,826 B1 | 12/2003 | Leanos |
| 6,659,365 B2 | 12/2003 | Gipson et al. |
| 6,676,003 B2 | 1/2004 | Ehlert et al. |
| 6,689,730 B2 | 2/2004 | Hortel et al. |
| 6,739,524 B2 | 5/2004 | Taylor-McCune et al. |
| 6,770,600 B1 | 8/2004 | Lamola et al. |
| 6,817,541 B2 | 11/2004 | Sands et al. |
| 6,818,128 B2 | 11/2004 | Minter |
| 6,837,445 B1 | 1/2005 | Tsai |
| 6,841,921 B2 | 1/2005 | Stegelmann |
| 6,858,181 B2 | 2/2005 | Aoyagi |
| 6,878,288 B2 | 4/2005 | Scott |
| 6,883,724 B2 | 4/2005 | Adiga et al. |
| 6,890,593 B2 | 5/2005 | Tian |
| 6,897,628 B2 | 5/2005 | Gunnerman |
| 6,902,650 B2 | 6/2005 | Park et al. |
| 6,911,153 B2 | 6/2005 | Minter |
| 6,929,750 B2 | 8/2005 | Laurell et al. |
| 6,935,770 B2 | 8/2005 | Schueler |
| 6,936,151 B1 | 8/2005 | Lock |
| 7,018,546 B2 | 3/2006 | Kurihara et al. |
| 7,083,322 B2 | 8/2006 | Moore et al. |
| 7,083,764 B2 | 8/2006 | Scott |

| | | |
|---|---|---|
| 7,090,391 B2 | 8/2006 | Taniguchi |
| 7,108,137 B2 | 9/2006 | Lal et al. |
| 7,150,779 B2 | 12/2006 | Meegan, Jr. |
| 7,156,201 B2 | 1/2007 | Peshkovskiy et al. |
| 7,293,909 B2 | 11/2007 | Taniguchi |
| 7,322,431 B2 | 1/2008 | Ratcliff |
| 7,338,551 B2 | 3/2008 | Kozyuk |
| 7,404,666 B2 | 7/2008 | Tessien |
| 7,414,009 B2 | 8/2008 | Tanaka et al. |
| 7,419,519 B2 | 9/2008 | Li et al. |
| 7,424,883 B2 | 9/2008 | McNichols et al. |
| 7,465,426 B2 | 12/2008 | Kerherve et al. |
| 7,504,075 B2 | 3/2009 | Marhasin |
| 7,516,664 B2 | 4/2009 | Meier et al. |
| 7,533,830 B1 | 5/2009 | Rose |
| 7,582,156 B2 | 9/2009 | Tanaka et al. |
| 7,673,516 B2 | 3/2010 | Janssen et al. |
| 7,703,698 B2 | 4/2010 | Janssen et al. |
| 7,712,353 B2 | 5/2010 | Janssen et al. |
| 7,735,751 B2 | 6/2010 | Ehlert et al. |
| 7,785,674 B2 | 8/2010 | Janssen et al. |
| 2001/0040935 A1 | 11/2001 | Case |
| 2002/0036173 A1* | 3/2002 | Feke et al. .................... 210/748 |
| 2002/0164274 A1 | 11/2002 | Haggett et al. |
| 2003/0042174 A1 | 3/2003 | Austin |
| 2003/0047067 A1 | 3/2003 | Kraus et al. |
| 2003/0048692 A1 | 3/2003 | Cohen et al. |
| 2003/0051989 A1 | 3/2003 | Austin |
| 2003/0061939 A1 | 4/2003 | Hutton et al. |
| 2003/0066899 A1 | 4/2003 | Gipson |
| 2003/0116014 A1 | 6/2003 | Possanza et al. |
| 2003/0143110 A1 | 7/2003 | Kritzler |
| 2003/0194692 A1 | 10/2003 | Purdum |
| 2003/0234173 A1 | 12/2003 | Minter |
| 2004/0022695 A1 | 2/2004 | Simon |
| 2004/0065599 A1 | 4/2004 | Lal et al. |
| 2004/0079580 A1 | 4/2004 | Manna et al. |
| 2004/0120904 A1 | 6/2004 | Lye et al. |
| 2004/0142041 A1 | 7/2004 | MacDonald et al. |
| 2004/0187524 A1 | 9/2004 | Sen et al. |
| 2004/0202728 A1* | 10/2004 | Shanker et al. ................ 424/690 |
| 2005/0000914 A1 | 1/2005 | Dahlberg et al. |
| 2005/0008560 A1 | 1/2005 | Kataoka et al. |
| 2005/0017599 A1 | 1/2005 | Puskas |
| 2005/0025797 A1 | 2/2005 | Wang |
| 2005/0082234 A1 | 4/2005 | Solenthaler |
| 2005/0084438 A1 | 4/2005 | Do et al. |
| 2005/0084464 A1 | 4/2005 | McGrath et al. |
| 2005/0085144 A1 | 4/2005 | MacDonald et al. |
| 2005/0092931 A1 | 5/2005 | Gadgil et al. |
| 2005/0129161 A1 | 6/2005 | Laberge |
| 2005/0207431 A1 | 9/2005 | Beca et al. |
| 2005/0235740 A1 | 10/2005 | Desie |
| 2005/0260106 A1 | 11/2005 | Marhasin |
| 2006/0000034 A1 | 1/2006 | McGrath |
| 2006/0008442 A1 | 1/2006 | MacDonald et al. |
| 2006/0120212 A1 | 6/2006 | Taniguchi et al. |
| 2007/0114306 A1 | 5/2007 | Kawakami et al. |
| 2007/0119785 A1 | 5/2007 | Englehardt et al. |
| 2007/0131034 A1 | 6/2007 | Ehlert et al. |
| 2007/0170277 A1 | 7/2007 | Ehlert |
| 2008/0062811 A1 | 3/2008 | Janssen et al. |
| 2008/0063718 A1 | 3/2008 | Janssen et al. |
| 2008/0067418 A1 | 3/2008 | Ross |
| 2008/0069887 A1 | 3/2008 | Baran et al. |
| 2008/0117711 A1 | 5/2008 | Omasa |
| 2008/0155763 A1 | 7/2008 | Janssen et al. |
| 2008/0156737 A1 | 7/2008 | Janssen et al. |
| 2008/0159063 A1 | 7/2008 | Janssen et al. |
| 2008/0192568 A1 | 8/2008 | Hielscher et al. |
| 2008/8251375 | 10/2008 | Hielscher et al. |
| 2009/0014377 A1 | 1/2009 | Janssen et al. |
| 2009/0147905 A1 | 6/2009 | Janssen et al. |
| 2009/0155091 A1 | 6/2009 | Ehlert et al. |
| 2009/0158936 A1 | 6/2009 | Janssen et al. |
| 2009/0162258 A1 | 6/2009 | Janssen et al. |
| 2009/0165654 A1 | 7/2009 | Koenig et al. |
| 2009/0166177 A1 | 7/2009 | Wenzel et al. |
| 2009/0168590 A1 | 7/2009 | Koenig et al. |
| 2009/0168591 A1 | 7/2009 | Wenzel et al. |
| 2009/0262597 A1 | 10/2009 | Kieffer et al. |
| 2010/0150859 A1 | 6/2010 | Do et al. |
| 2010/0206742 A1 | 8/2010 | Janssen et al. |
| 2010/0296975 A1 | 11/2010 | Peshkovsky et al. |

FOREIGN PATENT DOCUMENTS

| | | |
|---|---|---|
| CH | 657067 | 8/1986 |
| CN | 1247628 | 3/2006 |
| CN | 101153138 | 4/2008 |
| DE | 262553 A3 | 12/1988 |
| DE | 9017338 | 3/1991 |
| DE | 4444525 | 6/1996 |
| DE | 19854013 | 5/2000 |
| DE | 19913397 A1 | 9/2000 |
| DE | 19938254 | 2/2001 |
| DE | 19938254 A1 | 2/2001 |
| DE | 29825063 | 6/2004 |
| DE | 102004040233 | 3/2006 |
| DE | 102005025118 | 1/2007 |
| DE | 102005034629 | 1/2007 |
| EP | 0269941 A1 | 6/1988 |
| EP | 0292470 | 11/1988 |
| EP | 347891 | 12/1989 |
| EP | 0457187 A2 | 11/1991 |
| EP | 0459967 | 12/1991 |
| EP | 0625482 A | 11/1994 |
| EP | 0648531 | 4/1995 |
| EP | 0894612 A2 | 2/1999 |
| EP | 1954388 | 3/2007 |
| EP | 0983968 | 3/2008 |
| EP | 2173669 A2 | 4/2010 |
| EP | 2176173 A2 | 4/2010 |
| FR | 2793811 | 11/2000 |
| GB | 1404575 | 9/1975 |
| JP | 56028221 | 3/1981 |
| JP | 57119853 | 7/1982 |
| JP | 58034051 | 2/1983 |
| JP | 62001413 A | 1/1987 |
| JP | 62039839 U | 3/1987 |
| JP | 6372364 | 4/1988 |
| JP | 63104664 | 5/1988 |
| JP | 1108081 | 4/1989 |
| JP | 2025602 | 1/1990 |
| JP | 02281185 A | 11/1990 |
| JP | 03053195 A | 3/1991 |
| JP | 3086258 | 4/1991 |
| JP | 03-157129 A | 5/1991 |
| JP | 6228824 | 8/1994 |
| JP | 8304388 | 11/1996 |
| JP | 9286943 | 11/1997 |
| JP | 10060331 | 3/1998 |
| JP | 11133661 | 5/1999 |
| JP | 2000158364 | 12/1999 |
| JP | 2001017970 | 1/2001 |
| JP | 2001252588 | 9/2001 |
| JP | 2003103152 A | 4/2003 |
| JP | 2004020176 | 1/2004 |
| JP | 2004256783 | 9/2004 |
| JP | 2005118688 | 5/2005 |
| KR | 20020073778 A | 9/2002 |
| KR | 1020050013858 A | 2/2005 |
| KR | 1020050113356 A | 12/2005 |
| WO | 9400757 | 1/1994 |
| WO | 9420833 | 9/1994 |
| WO | 9429873 A | 12/1994 |
| WO | 9600318 | 1/1996 |
| WO | 9609112 A1 | 3/1996 |
| WO | 9743026 | 11/1997 |
| WO | 9817373 | 4/1998 |
| WO | 9844058 | 10/1998 |
| WO | 99/33520 | 7/1999 |
| WO | 0004978 | 2/2000 |
| WO | 0041794 | 7/2000 |
| WO | 0139200 A | 5/2001 |
| WO | 0222252 | 3/2002 |
| WO | 0250511 | 6/2002 |
| WO | 0280668 A2 | 10/2002 |
| WO | 2003012800 | 2/2003 |

| | | |
|---|---|---|
| WO | 03102737 | 12/2003 |
| WO | 2004026452 | 4/2004 |
| WO | 2004064487 | 8/2004 |
| WO | 2006037591 | 4/2006 |
| WO | 2006043970 A2 | 4/2006 |
| WO | 2006073645 A1 | 7/2006 |
| WO | 2006074921 | 7/2006 |
| WO | 2006/093804 A | 9/2006 |
| WO | 2007011520 A2 | 1/2007 |
| WO | 2005/011804 | 5/2007 |
| WO | 2007060245 A1 | 5/2007 |
| WO | 2007095871 | 8/2007 |
| WO | 2008029379 | 3/2008 |
| WO | 2008047259 | 4/2008 |
| WO | 2008085806 | 7/2008 |

OTHER PUBLICATIONS

International Search Report and Written Opinion regarding PCT/IB2008/052760, dated Feb. 17, 2009.
International Search Report and Written Opinion, PCT/IB2008/055051 (Feb. 20, 2009).
International Search Report and Written Opinion regarding PCT/IB2007/052947, dated Mar. 12, 2008.
International Search Report and Written Opinion for PCT/IB2008/052764 mailed Apr. 2, 2009.
International Search Report and Written Opinion from PCT/IB2008/052766, dated Mar. 31, 2009.
International Search Report and Written Opinion regarding PCT/IB2007/052945, dated Feb. 1, 2008.
Non-final office action regarding U.S. Appl. No. 11/617,515, dated Mar. 27, 2009.
U.S. Appl. No. 11/963,237, filed Dec. 21, 2007.
Peplow, Mark, "Desktop fusion is back on the table," viewed at http//nature.com/news/2006/060109/full/060109-5.html on May 4, 2007.
International Search Report and Written Opinion regarding PCT/IB2007/052988, dated Feb. 14, 2008.
Taleyarkhan, et al., "Evidence for Nuclear Emissions During Acoustic Cavitation," Science, (Mar. 8, 2002), vol. 295, pp. 1868-1873.
Kloeppel, James E. "Temperature inside collapsing bubble four times that of the sun," News Bureau, University of Illinois at Urbana-Champaign.
Tal-Figiel B., The Formation of Stable W/O, O/W, W/O/W Cosmetic Emulsions in an Ultrasonic Field, viewed at http://www.atypon-link.com/ICHEME/doi/abs/10.1205/cherd06199 on Oct. 19, 2007.
"Controlled Thermonuclear Fusion" viewed at http://library.thinkquest.org/17940/texts/fusion_controlled/fusion_controlled.html on Oct. 23, 2007.
Flannigan, "Measurement of Pressure and Density Inside a Single Sonoluminescing Bubble," Physical Review Letters (May 26, 2006), PRL 96.
Taleyarkhan, et al. "Additional Evidence of Nuclear Emissions During Acoustic Cavitation," Physical Review E, (Mar. 2004). vol. 69.
"Thermonuclear Fusion Energy Source for Future Generations," viewed at http://nature.com/news/2006/060109/full/060109-5.html on May 4, 2007.
Lahey, Taleyarkhan, and Nigmatulin, "Bubble Power, "IEEE spectrum, May 2005, pp. 39-43.
International Search Report and Written Opinion regarding PCT/IB2007/053621, dated Feb. 14, 2008.
International Search Report and Written Opinion regarding PCT/IB2007/053623, dated Feb. 14, 2008.
International Search Report and Written Opinion regarding PCT/IB2007/053622, dated Feb. 14, 2008.
U.S. Appl. No. 11/777,140, filed Jul. 12, 2007.
U.S. Appl. No. 11/617,497, filed Dec. 28, 2006.
U.S. Appl. No. 11/617,515, filed Dec. 28, 2006.
U.S. Appl. No. 11/777,151, filed Jul. 12, 2007.
U.S. Appl. No. 11/950,943, filed Dec. 5, 2007.
U.S. Appl. No. 11/963,139, filed Dec. 21, 2007.
U.S. Appl. No. 11/966,458, filed Dec. 28, 2007.
U.S. Appl. No. 11/966,472, filed Dec. 28, 2007.
U.S. Appl. No. 11/966,418, filed Dec. 28, 2007.
U.S. Appl. No. 11/966,447, filed Dec. 28, 2007.
U.S. Appl. No. 11/777,145, filed Dec. 12, 2007.
U.S. Appl. No. 11/965,435, filed Dec. 27, 2007.
Non-final office action regarding U.S. Appl. No. 11/950,943, dated May 1, 2009.
J.D. Lawson, "Some Criteria for a Power Producing Thermonuclear Reactor", Proc. Phys. Soc. B70, pp. 6-10 (1957).
L.A. Artsimovich, "Controlled Thermonuclear Reactions", Gordon and Breach Science Publishers, New York, first English translation, 1964.
D.R.O. Morrison, "Cold Fusion Update No. 9", Jan. 1994, from Newsgroups sci.physics.fusion, http://www.groups.google.com.
Brenner et al, Single-bubble sonoluminescence, Reviews of Modern Physics, vol. 74, Apr. 2002, pp. 425-484.
J. Lister, Plasma Physics and Controlled Fusion 48, pp. 715-716 (2006).
U.S. Department of Energy, "Report of the Review of Low Energy Nuclear Reactions", Dec. 1, 2004 (USDOE).
International Search Report and Written Opinion regarding PCT/IB2007/054892 dated May 15, 2008.
International Search Report and Written Opinion regarding PCT/IB2007/054898 dated May 15, 2008.
Final Office Action Regarding U.S. Appl. No. 11/530,311, dated Jun. 23, 2009.
Non-final office action regarding U.S. Appl. No. 11/617,497, dated Jun. 26, 2009.
International Search Report and Written Opinion regarding PCT/IB2008/055396, dated Jul. 29, 2009.
International Search Report and Written Opinion issued Aug. 18, 2009 for PCT/IB2008/055520.
International Search Report and Written Opinion issued Aug. 18, 2009 for PCT/IB2008/055517.
International Search Report and Written Opinion issued Aug. 18, 2009 for PCT/IB2008/055518.
International Search Report and Written Opinion regarding PCT/IB2008/055514, dated Aug. 25, 2009.
International Search Report and Written Opinion regarding PCT/IB2008/055395, dated Sep. 14, 2009.
International Search Report and Written Opinion regarding PCT/IB2008/055394, dated Sep. 28, 2009.
Blume, T. and Neis, U. "Improved wastewater disinfection by ultrasonic pre-treatment." Ultrasonics Sonochemistry, 2004, No. 11, pp. 333-336.
European Office Action regarding European Application No. 07805228.9, dated Oct. 9, 2009.
Non-final Office Action regarding U.S. Appl. No. 12/335,231, dated Oct. 15, 2009.
Non-final Office action issued in U.S. Appl. No. 11/777,140 on Aug. 9, 2010.
Non-Final Office action issued in U.S. Appl. No. 11/966,418 on Aug. 2, 2010.
Non-Final Office action issued in U.S. Appl. No. 11/966,447 on Aug. 2, 2010.
Non-final Office action regarding U.S. Appl. No. 11/965,435, dated Mar. 11, 2010.
English translation of Nagel WO 2006/074921 A1, accessed on the EPO website.
Takehi Moriguchi, et al. "Metal-modified silica adsorbents for removal of humic substances in water." Journal of Colloid and Interface Science 283, 2005 300-310, See Abstract, pp. 301 and 304.
International Search Report and Written Opinion regarding PCT/IB2009/055090, dated Jul. 16, 2010.
International Search Report and Written Opinion regarding PCT/IB2009/055092, dated Jul. 16, 2010.
Non-final Office action regarding U.S. Appl. No. 11/963,237, dated Jul. 8, 2010.
Non-final Office Action submitted in U.S. Appl. No. 12/704,058 dated Dec. 9, 2010.
Final Office action issued in U.S. Appl. No. 11/966,447 mailed Jan. 5, 2011.
Supplementary European Search Report issued in EP Application No. 08789242 mailed Dec. 17, 2010.

Non-final Office Action issued in U.S. Appl. No. 11/777,151 mailed Dec. 8, 2010.
Final Office Action issued in U.S. Appl. No. 11/966,418 mailed Jan. 12, 2011.
Non-final Office action issued in U.S. Appl. No. 11/963,139, dated Feb. 18, 2011.
Non-final Office action issued in U.S. Appl. No. 11/777,140, dated Feb. 23, 2011.
Oct. 27, 2010 Letter regarding the Office action issued for Mexican Patent Application Serial No. MX/a/2009/002519 mailed Oct. 12, 2010.
Kuo et al., "Nano-particles dispersion effect on Ni/Al2O3 Composite Coatings," Materials Chemistry and Physics, 86: 5-10 (2004).
Sivakumar et al., "Preparation of nanosized TiO2 supported on activated alumina by a sonochemical method: observation of an increased photocatalytic decolourisation efficiency," Research on Chemical Intermediates, 30(7-8): 785-792 (2004).
Non-final Office action issued in U.S. Appl. No. 11/530,210 on Jun. 28, 2010.
Non-final Office action issued in U.S. Appl. No. 11/530,210 on Dec. 1, 2010.
Final Office action issued in U.S. Appl. No. 11/777,140 Dec. 1, 2010.
Non-final Office Action received in U.S. Appl. No. 11/966,458 mailed Sep. 28, 2010.
Final Office Action issued in U.S. Appl. No. 11/966,458, dated Mar. 17, 2011.
Final Office Action issued in U.S. Appl. No. 12/335,231, dated Mar. 31, 2011.
Non-Final Office Action issued in U.S. Appl. No. 11/966,472, dated Mar. 31, 2011.
Barbaglia et al., "Search of Fusion Reactions During the Cavitation of a Single Bubble in Deuterated Liquids," Physica Scripta 72, pp. 75-78 (2005).
Final Office Action Issued for U.S. Appl. No. 11/530,210 mailed Apr. 19, 2011.

* cited by examiner

ULTRASONIC TREATMENT SYSTEM FOR SEPARATING COMPOUNDS FROM AQUEOUS EFFLUENT

BACKGROUND OF DISCLOSURE

The present disclosure generally relates to ultrasonic treatment systems for separating compounds in an aqueous solution. More particularly, the present disclosure relates to ultrasonic treatment systems that use ultrasonic energy to provide efficient and effective removal of compounds from aqueous effluents, such as textile effluents.

In nearly all textile dyeing and printing processes, some fraction of the applied colorant will not bind to the substrate. These unbound dyes and reactants are typically removed by a water rinsing process, generating large quantities of textile effluent that must be disposed of in an environmentally acceptable manner.

Previous attempts have disposed of the textile effluent by passing the effluent through an ion exchange resin or activated carbon. During these reactions, such materials or resins adsorb the dyes and other soluble components in the textile effluent slowly and require large volumes of the adsorbent to perform effectively.

Other attempts have utilized continuous chemical reactors such as a plug flow reactor containing adsorbent beads or particles having specific surface functionalities, through which dyes and reactants found in textile effluents are adsorbed. Specifically, the beads or particles are packed into a column in the plug flow reactor and an aqueous solution of textile effluent is pumped through the column, thereby exposing the surface of the beads or particles to allow for adsorption of the dyes and reactants in the effluent to occur. These moieties can be adsorbed onto the surface and within the pores of the beads or particles.

One problem with processing textile effluent through a column such as that of a conventional plug flow reactor, is that many of the compounds to be adsorbed (e.g., dyes and reactants) must travel through a hydrodynamic boundary layer surrounding the bead or particle. This boundary layer is a source of resistance for the compounds, which prolongs the adsorption process and increases time and costs of the removal of unbound dyes and reactants from textile effluents.

One previous attempt to reduce adsorption time required to remove the compounds from textile effluents is by increasing flow rate of the processing stream in the plug flow reactor. This reduces the thickness of the hydrodynamic boundary layer, which enhances the rate at which the transport of compounds to the surface of the beads and particles can occur. This solution, however, results in less residence time in the plug flow reactor for the adsorption process to occur. Additionally, there is increased pressure drop across the reactor, and as such, larger plug flow reactor geometries and processing equipment are required.

Based on the foregoing, there is a need in the art for an ultrasonic treatment system, such as a plug flow reactor, that prevents a thick hydrodynamic boundary layer from forming, and thus, allows for quicker more efficient removal of compounds such as dyes and reactants from aqueous effluents.

SUMMARY OF THE DISCLOSURE

The present disclosure is directed to novel ultrasonic treatment systems that have the improved ability to remove compounds, such as dyes and reactants, from aqueous effluents. The ultrasonic treatment systems can be used to remove compounds from various aqueous effluents such as, for example, textile effluents, beverages, and bodies of water. Additionally, the ultrasonic treatment systems have a thinner hydrodynamic boundary layer as compared to conventional plug flow reactors. Generally, the ultrasonic treatment systems comprise an ultrasonic treatment chamber comprising an inlet end, an outlet end, a packed column of an adsorbent, and an ultrasonic waveguide assembly. In one embodiment, the ultrasonic waveguide assembly is a horn assembly comprising a horn member. The ultrasonic waveguide assembly is disposed entirely within the ultrasonic treatment chamber of the ultrasonic treatment system.

As such, the present disclosure is directed to an ultrasonic treatment system for removing compounds from an aqueous effluent. The ultrasonic treatment system comprises an ultrasonic treatment chamber, which comprises an inlet end, an outlet end, a packed column of an adsorbent, and an ultrasonic waveguide assembly.

The present disclosure is further directed to a process for removing compounds from an aqueous effluent. The process comprises: packing a column of an ultrasonic treatment chamber of an ultrasonic treatment system with an adsorbent; energizing the adsorbent in the column with ultrasonic energy; introducing an aqueous effluent through an inlet end of the ultrasonic treatment chamber of the ultrasonic treatment system; and contacting the aqueous effluent with the energized adsorbent.

Other features of the present disclosure will be in part apparent and in part pointed out hereinafter.

DETAILED DESCRIPTION OF THE PREFERRED EMBODIMENT

The present disclosure is generally directed to an ultrasonic treatment system for removing compounds from aqueous effluent. Specifically, in one embodiment, the ultrasonic treatment system is capable of removing dyes and reactants from textile effluent. In another embodiment, the ultrasonic treatment system removes microorganisms and other contaminants from drinking water.

Figure 1:
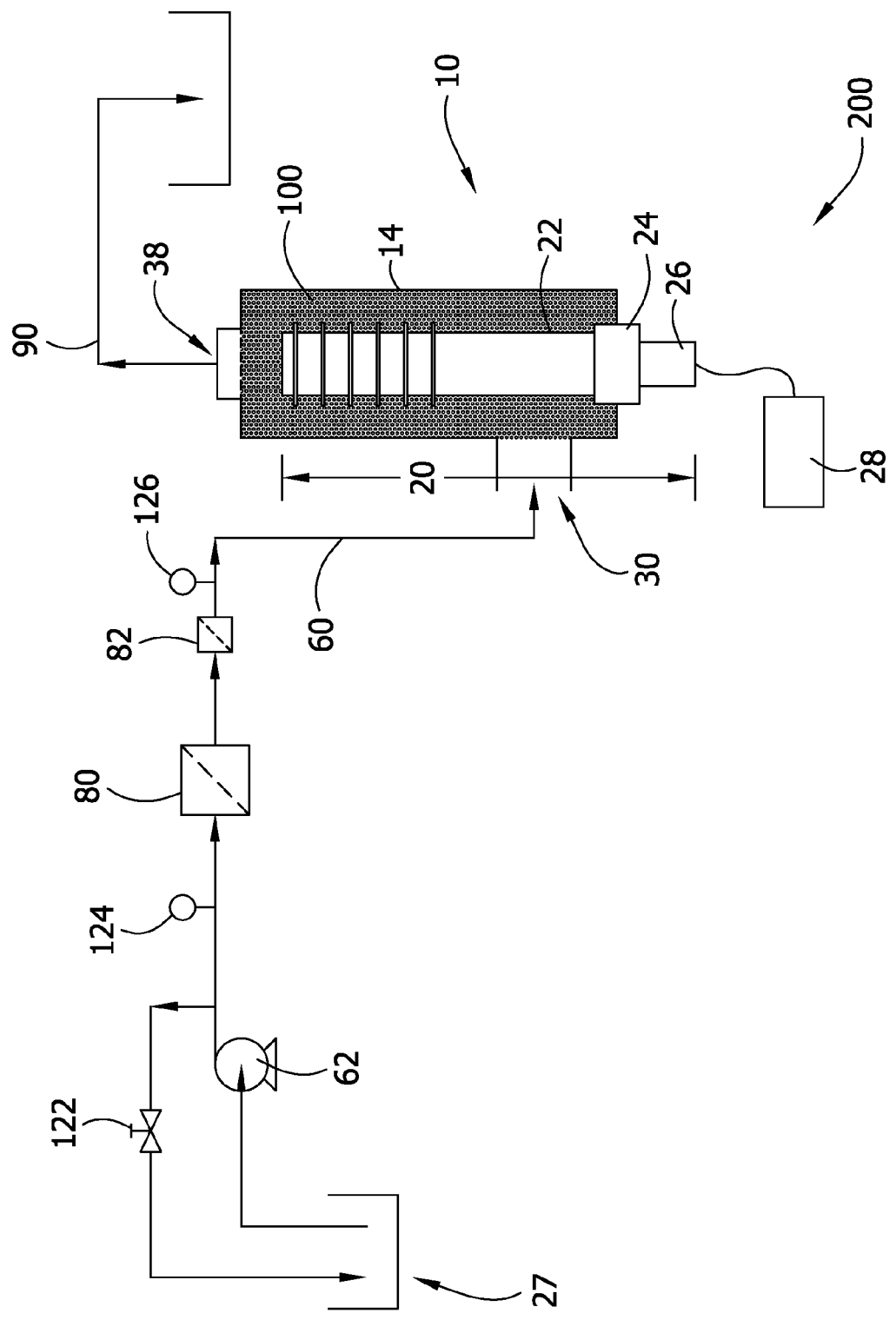
FIG. 1 is a schematic of one embodiment of an ultrasonic treatment system for removing compounds from an aqueous effluent.

FIG. 1 provides an ultrasonic treatment system, generally indicated at 200, to remove compounds from aqueous effluent in accordance with the present disclosure. Generally, the ultrasonic treatment system 200 comprises an ultrasonic treatment chamber 10. In particular, the treatment chamber 10 is suitable for use in ultrasonic treatment systems in which ultrasonic agitation of the effluent is desired in an in-line, e.g., continuous flow process in which fluid (e.g., aqueous effluent) flows continuously through the chamber. It is contemplated, though, that the treatment chamber may be used in an ultrasonic treatment system in which effluent is treated in accordance with a batch process instead of a continuous flow process and remain within the scope of this disclosure.

Figure 2:
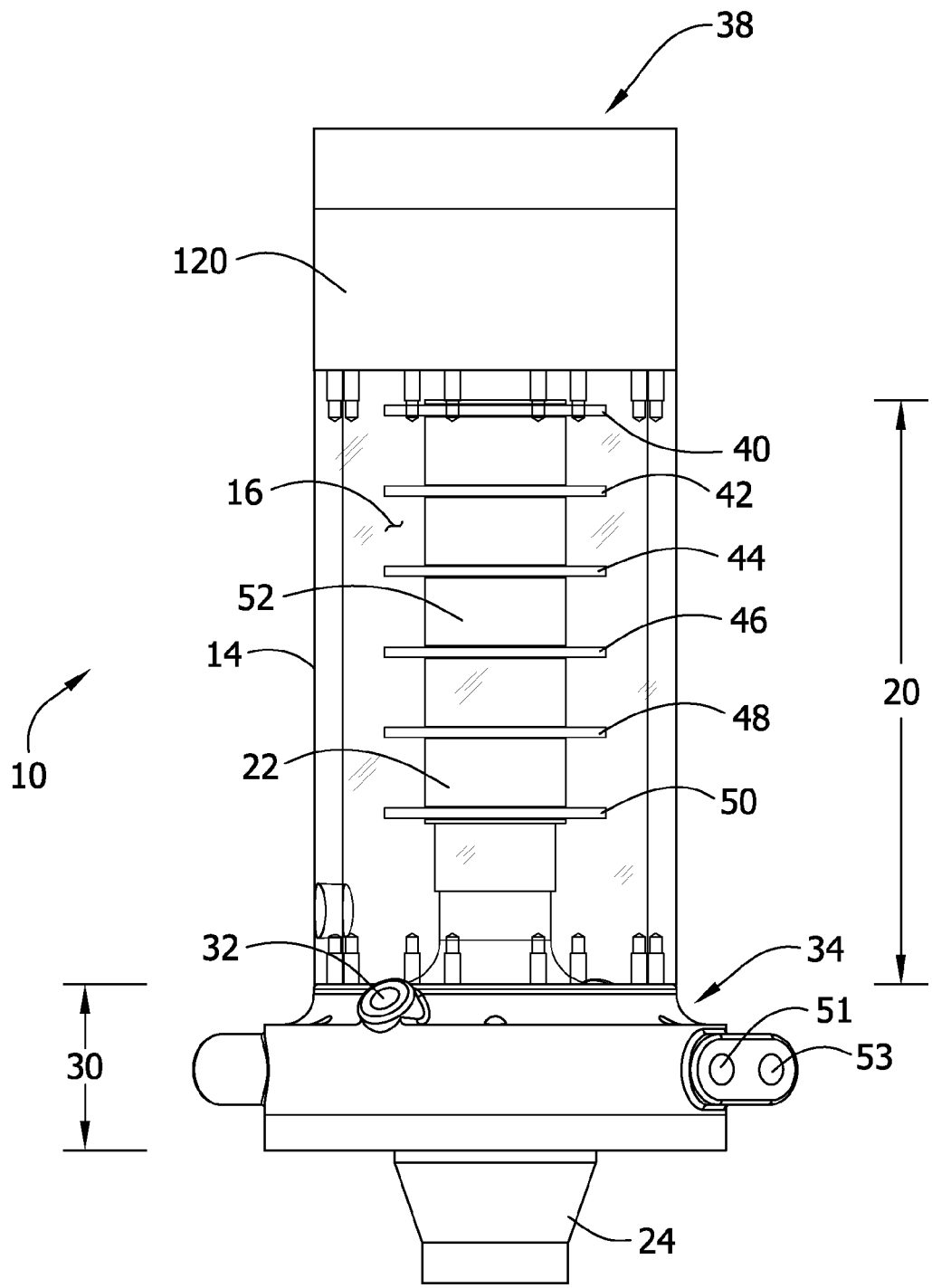
FIG. 2 is a side view of an ultrasonic treatment chamber comprising an ultrasonic waveguide assembly.

As illustrated in FIGS. 1 and 2, the ultrasonic treatment chamber 10 is generally elongate and is oriented vertically (e.g., a longitudinal axis of the chamber extends vertically) to define an inlet end 30 (a lower end in the orientation of the illustrated embodiment) and an outlet end 38 (an upper end in the orientation of the illustrated embodiment). The system 200 is configured such that fluid enters the treatment chamber 10 generally at the inlet end 30 thereof, flows generally longitudinally within the chamber 10 (e.g., upward in the orientation of the illustrated embodiment) and exits the chamber 10 generally at the outlet end 38 of the chamber 10.

The terms "upper" and "lower" are used herein in accordance with the vertical orientation of the ultrasonic treatment chamber illustrated in the various drawings and are not intended to describe the necessary orientation of the chamber in use. That is, while the chamber is most suitably oriented vertically, with the outlet end of the chamber above the inlet end as illustrated in the various drawings, it is understood that the chamber may be oriented with the inlet end above the outlet end, or it may be oriented other than in a vertical orientation and remain within the scope of this disclosure. The terms "axial" and "longitudinal" refer directionally herein to the lengthwise direction of the chamber (e.g., end-to-end such as the vertical direction in the illustrated embodiments). The terms "transverse," "lateral," and "radial" refer herein to a direction normal to the axial (e.g., longitudinal) direction. The terms "inner" and "outer" are also used in the reference to a direction transverse to the axial direction of the ultrasonic treatment chamber, with the term "inner" referring to a direction toward the interior of the chamber (e.g., toward the longitudinal axis of the chamber) and the term "outer" referring to a direction toward the exterior of the chamber (e.g., away from the longitudinal axis of the chamber).

The inlet end 30 may be produced using any suitable material, such as metal or plastic, and may be shaped in a variety of shapes. The inlet end 30 of the ultrasonic treatment chamber 10 is in fluid communication with a suitable storage stir tank, generally indicated at 27, that is operable to direct aqueous effluent 60 to, and more suitably through, the chamber 10.

With reference now to FIG. 2, the ultrasonic treatment chamber 10 comprises an elongate, generally tubular column 14 having longitudinally opposite ends defining an interior space 16 of the chamber 10 through which effluent delivered to the chamber 10 flows from the inlet end 30 to the outlet end 38 thereof. The column 14 is typically of a length that the compounds in the aqueous effluent and adsorbent have sufficient residence time so that substantially complete adsorption of the compounds to the surface of the adsorbent is effectuated. For example, in one embodiment, the column 14 is suitably from about 6 to about 10 inches in length. More suitably, the column 14 is about 8.6 inches in length.

Figure 4:
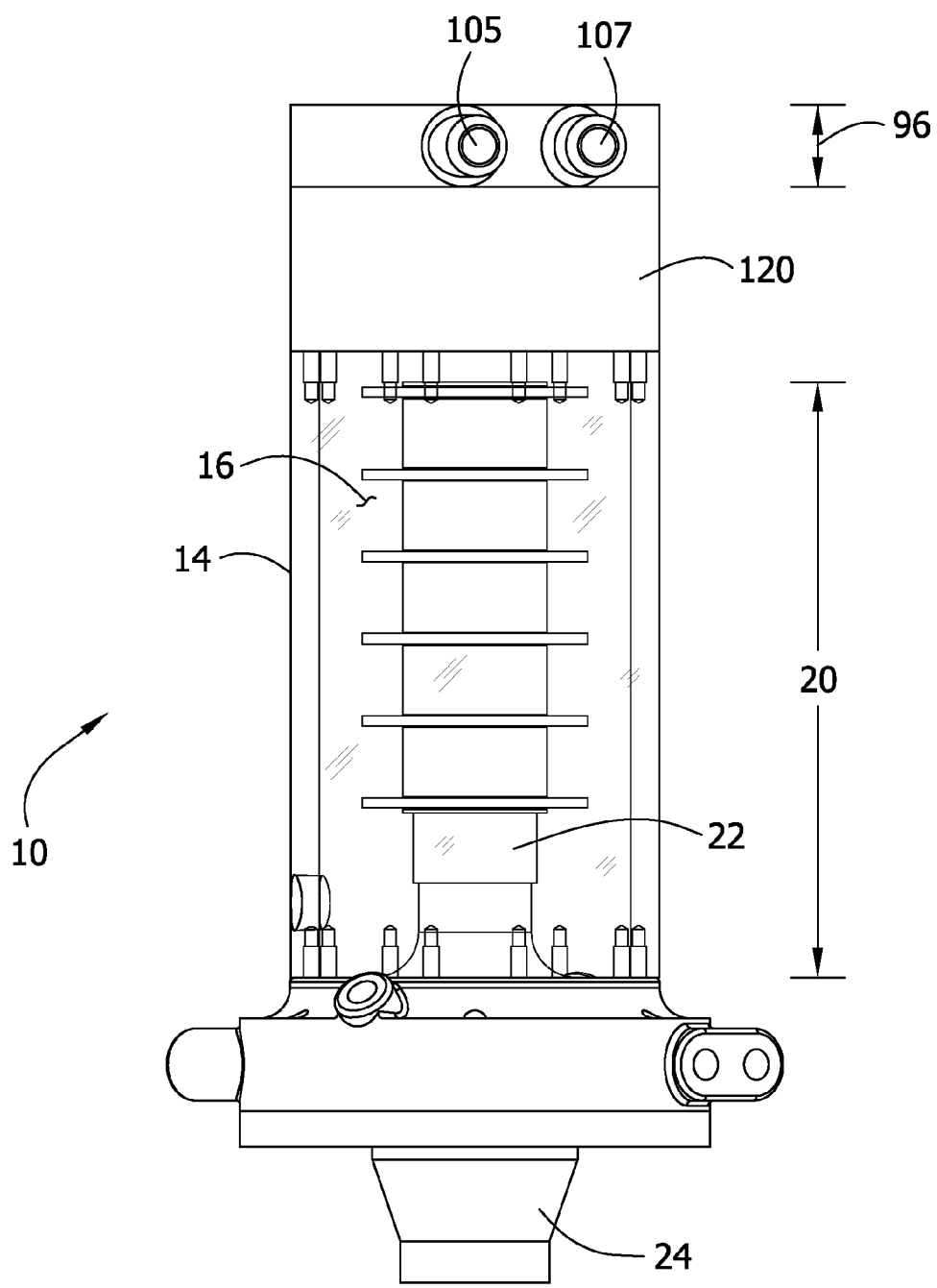
FIG. 4 is a side view of the ultrasonic treatment chamber of FIG. 2 further comprising a tangential flow cap.

The column 14 general defines, at least in part, a sidewall of the chamber 10. As illustrated in FIG. 2, the column 14 has an inlet port 32 formed therein through which the aqueous effluent to be treated within the chamber 10 is delivered to the interior space 16 thereof. In the illustrated embodiment, the column 14 further comprises an inlet collar 34 that is connected to and mounted on one end of the sidewall to generally define the inlet end 30 of the chamber 10. As illustrated in FIG. 4, the column 14 may additionally comprise a tangential flow cap 96 connected to and substantially closing the longitudinal opposite end of the sidewall, and having at least one outlet port (not shown) therein to generally define the outlet end 38 of the treatment chamber 10. The sidewall (e.g., defined by the elongate tubular column) of the chamber 10 has an inner surface that together with the collar 34 and cap 96 define the interior space 16 of the chamber 10. In the illustrated embodiment, the sidewall 14 is suitably generally annular in cross-section. However, it is contemplated that the cross-section of the chamber sidewall 14 may be other than annular, such as polygonal or another suitable shape, and remains within the scope of this disclosure. The chamber sidewall 14 of the illustrated chamber 10 is suitably constructed of a transparent material, although it is understood that any suitable material may be used as long as the material is compatible with the adsorbent to be energized, the pressure at which the chamber is intended to operate, and other environmental conditions such as temperature.

With particular reference to FIG. 2, the collar 34 defining the inlet end 30 of the chamber 10 is generally annular and has at least one, and more suitably a plurality of inlet ports (e.g., shown as 32, 51, and 53 in FIG. 2) formed therein for receiving fluid into the interior space 16 of the chamber 10. At least one inlet port is oriented generally tangentially relative to the annular collar 34 so that effluent flows into the interior space 16 of the chamber 10 generally tangentially thereto to impart a swirling action to the effluent as it enters the chamber 10. More suitably, in the illustrated embodiment, a pair of inlet ports 51 and 53 is arranged in parallel alignment with each other and extends generally tangentially relative to the annular collar, with one port being designated herein as the inner inlet port 51 and the other port being designated the outer inlet port 53.

An ultrasonic waveguide assembly 20 extends longitudinally within the interior space 16 of the chamber 10 to ultrasonically energize the adsorbent 100 located within the interior space 16 of the chamber 10 as described below. In particular, the waveguide assembly 20 of the illustrated embodiment extends longitudinally from the lower or inlet end 30 of the chamber 10 up into the interior space 16 thereof to a terminal end of the waveguide assembly. More suitably, the waveguide assembly 20 is connected, either directly or indirectly, to the chamber column 14 as will be described later herein.

The ultrasonic waveguide assembly 20 suitably comprises an elongate horn assembly, generally indicated at 22, disposed entirely within the interior space 16 of the column, e.g., for complete submersion within the effluent being treated within the chamber 10, and more suitably it is disposed coaxially with the chamber sidewall 14. The horn assembly 22 has an outer surface that together with the inner surface of the sidewall 14 defines the flow path within the interior space 16 of the chamber 10 along which effluent and the compounds to be removed flow past the horn assembly 22 within the chamber 10 (this portion of the flow path being broadly referred to herein as the ultrasonic treatment zone). The horn assembly 22 has an upper end defining a terminal end of the horn assembly 22 (and therefore the terminal end of the waveguide assembly) and a longitudinally opposite lower end. The waveguide assembly 20 of the illustrated embodiment also comprises a booster 24 coaxially aligned with and connected at an upper end thereof to the lower end of the horn assembly 22. It is understood, however, that the waveguide assembly 20 may comprise only the horn assembly 22 and remain within the scope of this disclosure. It is also contemplated that the booster 24 may be disposed entirely exterior of the chamber column 14, with the horn assembly 22 connected directly to the chamber column 14 without departing from the scope of this disclosure.

The waveguide assembly 20, and more particularly the booster 24, is suitably connected to the chamber column 14, e.g., to the tubular column defining the chamber sidewall, at the upper end thereof by a mounting member 79 (depicted in FIG. 3) that is configured to vibrationally isolate the waveguide assembly 20 from the ultrasonic treatment chamber column 14. That is, the mounting member 79 inhibits the transfer of longitudinal and transverse (e.g., radial) mechanical vibration of the waveguide assembly 20 to the chamber column 14 while maintaining the desired transverse position of the axis of the waveguide assembly 20 (and in particular the horn assembly 22) within the interior space 16 of the chamber column 14 and allowing both longitudinal and radial displacement of the horn assembly 22 within the chamber column 14.

As one example, the mounting member 79 of the illustrated embodiment generally comprises an annular outer segment 189 extending transverse to the waveguide assembly 20 in transversely spaced relationship therewith, and a flange member 191 interconnecting the outer segment 189 to the wave guide assembly 20. While the flange member 191 and transverse outer segment 189 of the mounting member 79 extend continuously about the circumference of the waveguide assembly 20, it is understood that one or more of these elements may be discontinuous about the waveguide assembly 20 such as in the manner of wheel spokes, without departing from the scope of this disclosure. The outer segment 189 of the mounting member 79 is particularly configured to seat down against a shoulder formed by the inlet collar 34.

Figure 3:
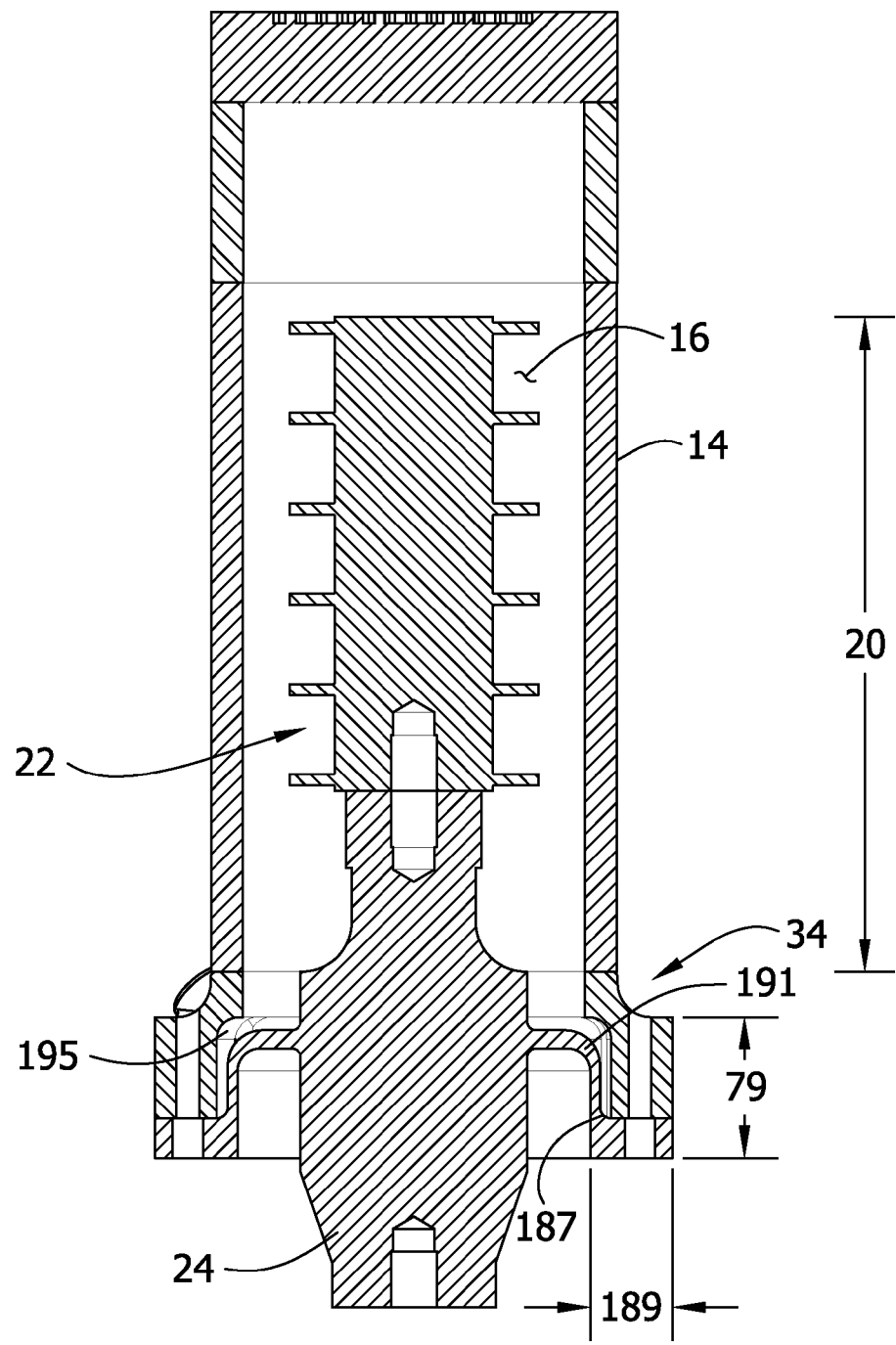
FIG. 3 is a longitudinal (e.g., vertical) cross-section of the chamber of FIG. 2.

As seen best in FIG. 3, the internal cross-sectional dimension (e.g., internal diameter) of the collar 34 is stepped outward as the collar 34 extends longitudinally downward away from the chamber sidewall 14 to accommodate the flange member 191. In one particularly suitable embodiment, the collar 34 is sufficiently sized to be transversely spaced from the flange member 191 to define a generally annular gap therebetween in which liquid delivered to the chamber 10 via the inlet ports of the collar 34 enters the interior space 16 of the chamber 10. This annular gap further facilitates the swirling action of the effluent upon entry into the chamber via the collar inlet ports.

The mounting member 79 is suitably sized in transverse cross-section so that at least an outer edge margin of the outer segment 189, and more suitably a substantial transverse portion of the outer segment is seated on the shoulder formed on the collar 34. A suitable fastening system, such as a bolt and nut (not shown) arrangement secures the outer segment 189 of the mounting member 79 to the shoulder formed by the collar 34 to thereby connect the booster 24 (and more broadly to connect the waveguide assembly 20) to the chamber column 14.

The flange member 191 may suitably be constructed relatively thinner than the outer segment 189 of the mounting member 79 to facilitate flexing and/or bending of the flange member 191 in response to ultrasonic vibration of the waveguide assembly 20. As an example, in one embodiment the thickness of the flange member 191 may be in the range of about 0.2 mm to about 5 mm, and more suitably about 2.5 mm. The flange member 191 of the illustrated mounting member 79 suitably has an inner transverse component connected to the waveguide assembly 20 and extending generally transversely outward therefrom but inward of the outer segment 189 of the mounting member 79, and an axial, or longitudinal component interconnecting the transverse inner component with the outer segment 189 of the mounting member 79 and together with the transverse inner component generally forming a generally L-shaped cross-section of the flange member 191. It is contemplated, however, that the flange member may instead have a generally U-shaped cross-section or other suitable cross-sectional shape such as an H-shape, an I-shape, an inverted U-shape and the like and remain within the scope of this disclosure. Additional examples of suitable mounting member configurations are illustrated and described in U.S. Pat. No. 6,676,003, the entire disclosure of which is incorporated herein by reference to the extent it is consistent herewith.

The longitudinal component of the illustrated flange member 191 is suitably cantilevered to the transverse outer segment 189 and to the transverse inner component of the flange, while the inner component of the flange is cantilevered to the waveguide assembly 20. Accordingly, the flange member 191 is capable of dynamically bending and/or flexing relative to the outer segment 189 of the mounting member 79 in response to transverse vibratory displacement of the inner segment 187 of the mounting member 189 to thereby isolate the chamber column 14 from transverse and radial displacement of the waveguide assembly 20.

While in the illustrated embodiment the transverse outer segment 189 of the mounting member 79 and the transverse inner component of the flange member 191 are disposed generally at longitudinally offset locations relative to each other, it is understood that they may be disposed at generally the same location (e.g., where the flange member is generally U-shaped in cross-section) or at locations other than those illustrated in FIG. 3) without departing from the scope of this disclosure.

In one particularly suitable embodiment the mounting member 79 is of single piece construction. Even more suitably the mounting member 79 may be formed integrally with the booster 24 (and more broadly with the waveguide assembly) as illustrated in FIG. 3. However, it is understood that the mounting member 79 may be constructed separate from the waveguide assembly 20 and remain within the scope of this disclosure. It is also understood that one or more components of the mounting member 79 may be separately constructed and suitably connected or otherwise assembled together.

In one suitable embodiment the mounting member 79 is further constructed to be generally rigid (e.g., resistant to static displacement under load) so as to hold the waveguide assembly 20 in proper alignment within the interior space 16 of the chamber 10. For example, the rigid mounting member in one embodiment may be constructed of a non-elastomeric material, more suitably metal, and even more suitably the same metal from which the booster (and more broadly the waveguide assembly) is constructed. The term rigid is not, however, intended to mean that the mounting member is incapable of dynamic flexing and/or bending in response to ultrasonic vibration of the waveguide. In other embodiments, the rigid mounting member may be constructed of an elastomeric material that is sufficiently resistant to static displacement under load but is otherwise capable of dynamic flexing and/or bending in response to ultrasonic vibration of the waveguide assembly. While the mounting member 79 illustrated in FIG. 3 is constructed of a metal, and more suitably constructed of the same material as the booster, it is contemplated that the mounting member may be constructed of other suitable generally rigid materials without departing from the scope of this disclosure.

A suitable ultrasonic drive system including at least an exciter 26 and a power source 28 is disposed exterior of the chamber 10 and connected to the booster 24 (and more broadly to the waveguide assembly 20) to energize the waveguide assembly 20 to mechanically vibrate ultrasonically. Examples of suitable ultrasonic drive systems include a Model 20A3000 system available from Dukane Ultrasonics of St. Charles, Ill., and a Model 2000CS system available from Herrmann Ultrasonics of Schaumberg, Ill.

In one embodiment, the drive system is capable of operating the waveguide assembly at a frequency in the range of from about 15 kHz to about 100 kHz, more suitably in the range of from about 15 kHz to about 60 kHz, even more suitably in the range of from about 20 kHz to about 40 kHz, and even more suitably at a frequency of about 20 kHz. Such ultrasonic drive systems are well known to those skilled in the art and need not be further described herein.

With particular reference to FIG. 2, the horn assembly 22 comprises an elongate, generally cylindrical horn member having an outer surface, and two or more agitating members connected to the horn member and extending at least in part transversely outward from the outer surface of the horn member in longitudinally spaced relationship with each other. In the illustrated embodiment, the agitating members comprise a series of six washer-shaped rings 40, 42, 44, 46, 48, and 50 that encircle the horn member in longitudinally spaced relationship with each other and radially outward from the outer surface of the horn member. It is understood, however, that the agitating members need not each be continuous about the circumference of the horn member. For example, the agitating members may suitably instead take the form of spokes, fins or other discrete structural members that extend transversely outward from the outer surface of the horn member.

As one example of the relative spacing between the rings, the horn member suitably has a length of about 5.25 inches (133.4 mm). One of the rings is disposed adjacent the terminal end of the horn member (and hence of the waveguide assembly), and more suitably is longitudinally spaced approximately 0.063 inches (1.6 mm) from the terminal end of the horn member. The rings are each about 0.125 inches (3.2 mm) in width and are longitudinally spaced from each other (between facing surfaces of the rings) a distance of about 0.875 inches (22.2 mm).

It is understood that the number of agitating members (e.g., the rings in the illustrated embodiment) may be less than or more than six without departing from the scope of this disclosure. It is also understood that the longitudinal spacing between the agitating members may be other than as illustrated in FIG. 2 and described above (e.g., either closer or spaced further apart). While the rings illustrated in FIG. 2 are equally longitudinally spaced from each other, it is alternatively contemplated that where more than two agitating members are present the spacing between longitudinally consecutive agitating members need not be uniform to remain within the scope of this disclosure.

In particular, the locations of the agitating members are at least in part a function of the intended displacement of the agitating members upon vibration of the horn member. For example, in the illustrated embodiment the horn member has a nodal region 52 located generally longitudinally centrally of the horn member (e.g., between the third and fourth rings). As used herein, the "nodal region" of the horn member refers to a longitudinal region or segment of the horn member along which little (or no) longitudinal displacement occurs during ultrasonic vibration of the horn member and transverse (e.g., radial in the illustrated embodiment) displacement of the horn member is generally maximized. Transverse displacement of the horn member suitably comprises transverse expansion of the horn member but may also include transverse movement (e.g., bending) of the horn member.

In the illustrated embodiment, the configuration of the horn member is such that the nodal region 52 is particularly defined by a nodal plane (i.e., a plane transverse to the horn member at which no longitudinal displacement occurs while transverse displacement is generally maximized). This plane is also sometimes referred to as a nodal point.

Accordingly, agitating members 40 and 50 (e.g., in the illustrated embodiment, rings) that are disposed more distally from the nodal region of the horn member will experience primarily axial (e.g., longitudinal) displacement while agitating members 46 an 48 that are nearer to the nodal region 52 will experience an increased amount of transverse displacement and a decreased amount of axial displacement relative to the longitudinally most distal agitating members. It is understood that the horn member may be configured so that the nodal region is other than longitudinally centrally located on the horn member without departing from the scope of this disclosure.

Still referring to FIG. 2, the agitating members are sufficiently sized in thickness and transverse length (i.e., the distance that the agitating member extends transversely outward from the outer surface of the horn member) to facilitate dynamic flexing/bending of the agitating members in response to the ultrasonic vibration of the horn member. In one suitable embodiment, a ratio of the transverse length of the agitating member to the thickness of the agitating member is in the range of about 2:1 to about 6:1. As one example, the rings each extend transversely outward from the outer surface of the horn a length of about 0.5 inches (12.7 mm) and the thickness of each ring is about 0.125 inches (3.2 mm), so that the ratio of transverse length to thickness of each ring is about 4:1. It is understood, however that the thickness and/or the transverse length of the agitating members may be other than as described above without departing from the scope of this disclosure. Also, while the rings of the illustrated embodiment each have the same transverse length and thickness, it is understood that the agitating members may have different thicknesses and/or transverse lengths.

The transverse length of the agitating member also at least in part defines the size (and at least in part the direction) of the flow path along which effluent in the interior space 16 of the chamber column 14 flows past the horn assembly 22. For example, the horn member of one embodiment has a radius of about 0.875 inches (22.2 mm) and the transverse length of each ring is, as discussed above, about 0.5 inches (12.7 mm). The radius of the inner surface of the column sidewall is approximately 1.75 inches (44.5 mm) so that the transverse spacing between each ring and the inner surface of the column sidewall is about 0.375 inches (9.5 mm). It is contemplated that the spacing between the horn member outer surface and the inner surface of the chamber column sidewall and/or between the agitating members and the inner surface of the chamber column sidewall may be greater or less than described above without departing from the scope of this disclosure.

In general, the horn member may be constructed of a metal having suitable acoustical and mechanical properties. Suitable metals include aluminum, monel, titanium, stainless steel, and some alloy steels. In one preferred embodiment, the metal can be titanium-based material, such as commercially pure titanium, or a titanium alloy (e.g., $Ti_6Al_4V$). It is also contemplated that all or part of the horn member may be coated with another metal. In one particularly suitable embodiment, the agitating members are constructed of the same material as the horn member, and are more suitably formed integrally with the horn member. In other embodiments, one or more of the agitating members may instead be formed integrally with the horn member. In other embodiments, one or more of the agitating members may instead be formed separate from the horn member and connected thereto to form the horn assembly.

In one embodiment, a baffle assemble (not shown) can be disposed within the interior space of the chamber column, and in particular generally transversely adjacent the inner surface of the sidewall and in generally transversely opposed relationship with the horn assembly. The baffle assemble comprises one or more baffle members disposed adjacent the inner surface of the column sidewall and extending at least in part transversely inward from the inner surface of the sidewall toward the horn assembly. The baffle members can facilitate the flow of effluent over the agitating members of the horn assembly. A suitable baffle assemble is described more fully in co-pending application Reference No. K-C 64122562 (KCC 5091), which is hereby incorporated by reference to the extent it is consistent herewith.

The ultrasonic treatment system is capable of removing compounds from an aqueous effluent using an energized adsorbent 100 packed into the interior space 16 of the chamber column 14. Typically, from about 10% (by void volume) to about 90% (by void volume) of the column is packed with adsorbent. More suitably, the adsorbent is packed into the column in an amount of from about 30% (by void volume) to about 70% (by void volume).

Various different adsorbents can be used in the present disclosure. In one particularly preferred embodiment, the adsorbent is an alumina. Specifically, alumina powder alone or alumina-containing beads/particles may be used, depending upon the desired end use of the ultrasonic treatment system. In one embodiment, the alumina is an alumina powder, preferably a Brockmann I activated aluminum oxide powder (also referred to herein as activated alumina).

Activated alumina is manufactured by mild calcinations of aluminum hydroxide (aluminum trihydrate, boehmite), which is an intermediate in the industrial production of aluminum from Bauxite. Specifically, it is precipitated from a sodium aluminate solution. By heating the aluminum hydroxide so obtained at temperatures around 500° C., approximately 33% (by weight) constitutional water is removed, and the crystal structure of the boehmite remains intact.

Aluminas are hydrophilic and have high capacities. As such, activated alumina could suitable capture anionic dyes and surfactants, and chelate with many non-polar dyes.

A full range of standardized aluminas are available with defined activities, pH values, and particles sizes. Activated alumina can be characterized by its Brockmann activity (e.g., activity grades of I, II, III, IV, and V), which is measured using the Brockmann and Schodder test disclosed in Brockmann & Schodder, Ber. Dtsh. Chem. Ges., 74B, 73 (1941). Generally, the activity grade is measured as follows: a standardized volume of a pair of test dyes dissolved in a standard solvent is applied to a standardized column, and after chromatographic development, the activity grade is shown by whether the test dyes separate or not. The test dye pairs that can be used are: (I) azobenzene and p-methoxyazobenzene, (Ii) p-methoxyazobenzene and Sudan Yellow, (III) Sudan Yellow and Sudan Red, (IV) Sudan Red and p-aminoazobenzene, and (V) p-aminoazobenzene and p-hydroxyazobenzene. Specifically, 20 milligrams of each of the two dyes from the above dye pairs is weighed into 50 milliliters of a solvent mixture containing one part pure benzene and four parts pure petroleum ether (boiling point 50-70° C.) to produce test dye solutions. Ten milliliters of each test dye solution are then applied to the top of a column containing 100-150 millimeters of the adsorbent to be tested. The columns are then eluted with 20 milliliters of eluent, which is the same mixture as used for the solvent above. To determine the activity grade, the migration distance of the test dye in front is measured. The activity grade is then given by the number of the pair of test dyes, in addition to the distance, in millimeters, from the top of the column to the front of the foremost migrated dye. An activated alumina having a Brockmann I Activity is the most reactive.

Brockmann I activated alumina can be converted to grades of lower activity by simply adding water. Specifically, to convert a Brockmann I activated alumina to a Brockmann II activated alumina, 3% (by total weight activated alumina powder) water is added to the Brockmann I activated alumina. To convert the grade I activated alumina to a grade III activated alumina, 6% (by total weight activated alumina powder) water is added, for grade IV, 10% (by total weight activated alumina powder) water is added to the Brockmann I activated alumina, and for grade V, 15% (by total weight activated alumina powder) water is added.

Examples of suitable Brockmann I activated alumina powders are commercially available from CAMAG Scientific Inc. (Wilmington, N.C.) and Sigma-Aldrich (St. Louis, Mo.).

In another embodiment, the alumina can be a particle such as an alumina or silica bead or particle. The types of particles to be used depend upon the aqueous effluent to be treated and the compounds to be removed from the aqueous effluent. For example, in one particular embodiment, the alumina particles are activated alumina particles produced from the activated alumina powder described above.

Another suitable alumina particle is an alumina particle that can contain various other ingredients. In general, the particle can contain any material that does not adversely interfere with the ability of the compounds, which are to be removed from the aqueous effluent, to bond to alumina. In this regard, at least a portion of the alumina contained by the particle should be present on the surface of the particle so that the alumina is available for adsorbing the compounds.

For example, in one embodiment, the alumina particles for use in the ultrasonic treatment system of the present disclosure are alumina sol particles. Alumina sols are colloidal hydrous alumina that can maintain a wide range of viscosities and are highly heat resistant. Many different types of alumina sols are commercially available with varying particle sizes. Of particular advantage, alumina sols can be prepared that carry a relatively strong positive surface charge or zeta potential. In this embodiment, the particle that is reacted with the compounds contains primarily, and in some embodiments, exclusively alumina. Examples of alumina particle materials include Aluminasol-100 and Aluminasol-200, which are both commercially available from Nissan Chemical America (Houston, Tex.).

In another embodiment, the particle can contain a core material coated with alumina. The alumina can form a continuous or a discontinuous coating over the particle. The core material can be, for instance, an inorganic oxide, such as silica. For example, in one embodiment, sols can be used that contain silica nanoparticles that have an alumina surface coating. Such sols are commercially available from Nissan Chemical America (Houston, Tex.). The silica is coated with alumina to provide stability to the sols over certain pH ranges. In fact, alumina coated silica sols may have greater stability in some applications of the present disclosure in comparison to alumina sols. Specific examples of alumina coated particles with silica cores include SNOWTEX-AK®, available from Nissan Chemical America (Houston, Tex.) and Ludox Cl®, available from Grace Davison (Columbia, Md.).

When the alumina is in particle form, the particles have an average particle size of from about 5 nanometers to less than 500 microns. More suitably, the alumina particles have an average particle size of from about 10 nanometers to less than 1 micron, and even more suitably, from about 15 nanometers to about 25 nanometers.

Other adsorbent materials are also suitable for use in the present disclosure. Examples include activated carbon, zeolites, and silica. Silica functions similar to the activated alumina described above.

Activated carbon is hydrophobic in nature and generally favors organic materials. It is typically used to remove organic pollutants from aqueous effluents. Activated carbon can suitable adsorb non-polar compounds such as dyes and pigments in aqueous effluents.

Generally, zeolites are hydrated alumino-silicate minerals with porous structures. They are hydrophilic with polar, regular channels, and are typically used in air separation and dehydration. Zeolites could suitably remove compounds such as acid dyes, reactive dyes, surfactants, and the like from aqueous effluents.

Without being bound to a particular theory, it is believed that using an energized adsorbent provides for improved adsorption of the compounds to be removed from the aqueous effluent onto the surface of the adsorbent. Generally, it has been found that an adsorbent that has been energized using ultrasonic energy can more efficiently and more effectively bind to compounds, allowing for an improved removal of these compounds from aqueous effluent. Specifically, by subjecting the adsorbent in the ultrasonic treatment system to ultrasonic energy, microcavitation within the aqueous effluent will occur. As the small bubbles produced through microcavitation collapse or oscillate, microconvective currents are produced, which result in a flow of fluid in an otherwise stagnant zone. Additionally, the acoustic wave produced by the ultrasonic energy produces a pulsed bulk motion that further provides for fluid agitation. The increased fluid flow produced by both the microcavitation and the acoustic wave results in reducing the thickness of the hydrodynamic boundary layer that surrounds the adsorbent. This effect allows for improved mass transport of the compounds in the aqueous effluent to the surface of the adsorbent, allowing for a quicker, more effective adsorption.

In one embodiment, the aqueous effluent is textile effluent resulting from textile dyeing and printing processes. Specifically, the textile effluent contains the fraction of the applied colorant that will not bind to the substrate being dyed. These unbound colorants are typically removed by a water rinsing process, generating large quantities of textile effluent that must be disposed of in an environmentally acceptable manner.

Compounds to be removed from the textile effluent in the above embodiment can include, for example, dyes, tannins, optical brighteners, sizing agents, enzymes, bleaching agents, surfactants, salts, lubricants, fire retardants, plasticizers, monomers such as acrylics, methacrylics, acrylonitriles, initiators, acids such as acetic, asorbic, citric, malic, and formic acids, alkali such as sodium carbonate, UV absorbers, and combinations thereof.

In another embodiment, the aqueous effluent is a beverage, such as fruit juices, wine, and beer. For example, in one embodiment, the beverage is wine. When making wine, compounds such as yeast cells, particles of grape skins, tartrates, proteins, tannins, and other suspended solids must be removed to produce a product that is sterile, visually clear, less bitter, and shelf-stable. Similarly, when the beverage is beer, compounds such as yeast, protein/polyphenol complexes, and other insoluble material must be removed. Moreover, microorganisms and byproducts of fruit spoilage, such as mycotoxins produced by mold, must be removed from fruit juices and wine. Additionally, fruits such as oranges and grapefruits have bitter compounds including limonin, hesperidin, and polyphenols, which must be removed from the juice during processing.

Additionally, in accordance with the present disclosure, the aqueous effluent can be water. Specifically, in one embodiment, the aqueous effluent is drinking water. For example, many homes, businesses and communities rely on underground water for their fresh drinking water. By drilling wells to various depths, this underground water, which is in underground aquifers, is trapped and used. Many times, this underground water contains measurable levels of organics that, for health reasons, are considered unusable for human consumption. Examples of hazardous organic compounds include arsenic and fluoride. Other organics can include organic chemicals such as herbicides, pesticides, fertilizers, and the like that have been deposed of by depositing them in landfills or by letting them seep into the ground and air from waste lagoons. Under some circumstances, gasoline has entered into the ground water from corroded underground storage tanks. Furthermore, many types of microorganisms, such as bacteria, can grow in underground water. Additionally, similar to the beverages above, proteins and other insoluble material that produce a cloudy appearance should be removed to produce acceptable drinking water. Examples of other insoluble material include high levels of humic substances, which are organic molecules created by microbial degradation of plant and animal matter. Their brown color is aesthetically unpleasing to the consumer and the substances can further react with oxidizing agents in treatment processes such as chlorine or ozone to produce disinfection by-products (DBPs).

The aqueous effluent, in another embodiment, can be a body of water such as a river, lake, or stream that has become contaminated and must be treated to meet government environmental laws. Such bodies of water typically contain one or more impurities such as suspended solids, dissolved organic matter, microorganisms, dissolved mineral matter, and the like.

While the present disclosure describes using an energized adsorbent to remove compounds from an aqueous effluent, non-aqueous filtrations can also be conducted using the adsorbent and ultrasonic treatment system of the present disclosure.

In addition to the ultrasonic treatment system, the present disclosure is also directed to processes of using the ultrasonic treatment system to remove compounds from an aqueous effluent. Generally, the process for using the ultrasonic treatment system comprises: (1) packing a column of an ultrasonic treatment chamber of a ultrasonic treatment system with an adsorbent; (2) energizing the adsorbent in the column with ultrasonic energy; (3) introducing an aqueous effluent through an inlet end of the ultrasonic treatment chamber of the ultrasonic treatment system; and (4) contacting the aqueous effluent with the energized adsorbent.

As depicted in FIG. 1, an adsorbent 100 is packed into a column 14 of an ultrasonic treatment chamber 10 of an ultrasonic treatment system 200. The adsorbent 100 can typically be packed into the column 14 using any means known in the art. The column is suitably packed with adsorbent so that the adsorbent fills from about 10% (by void volume) to about 90% (by void volume) of the column. More suitably, the column contains adsorbent that fills from about 30% (by void volume) to about 70% (by void volume) of the column.

The adsorbent in the column of the ultrasonic treatment system is then energized using ultrasonic energy. Specifically, in one suitable embodiment, an alumina powder or alumina-containing particle as described above is contacted with ultrasonic energy produced by the ultrasonic waveguide assembly ultrasonically excited using the ultrasonic drive system as described above. The ultrasonic waveguide assembly is suitably disposed entirely within the interior space of the ultrasonic treatment chamber of the ultrasonic treatment system.

Referring to FIG. 1, the process further comprises introducing an aqueous effluent 60 through the inlet end 30 of the ultrasonic treatment chamber 10 of the ultrasonic treatment system 200. The aqueous effluent 60 is generally stored in a stir tank 27 under continuous stirring. Typically, the ultrasonic treatment system 200 uses a pump 62 to pump the aqueous effluent 60 from the stir tank 27 to the inlet end 30 of the ultrasonic treatment chamber 10 of the ultrasonic treatment system 200. In one particularly preferred embodiment, the pump includes a motor with a speed controller.

Suitable pumps for use in pumping the aqueous effluent from the stir tank to the inlet end of the ultrasonic treatment chamber can include, for example, diaphragm pumps, peristaltic pumps, centrifugal pumps, and magnetically coupled gear pumps. In one particularly preferred embodiment, the pump is a magnetically coupled gear pump, manufactured by Micropump Corporation (Vancouver, Wash.), operating at a fluid flow rate of from about 0.1 liters/minute to about 6.0 liters/minute.

In one embodiment, the ultrasonic treatment system 200 comprises a flow control valve 122 as shown in FIG. 1. The flow control valve 122 suitably is a needle valve or ball valve and is used to regulate the flow rate of the fluid pumped using pump 62 into the ultrasonic treatment chamber 10. Particularly, the flow control value is advantageous if the pump discharge flow rate is greater than the desired flow rate into the chamber. Suitable flow control values are commercially available from Parker (Cleveland, Ohio).

In another embodiment, the ultrasonic treatment system can comprise one or more pressure gauges. For example, in FIG. 1, pressure gauges 124 and 126 are used in the ultrasonic treatment system 200. The pressure gauges can be used to monitor the pressure drop across strainer units described more fully below. Suitable pressure gauges are commercially available from Ashcroft (Stratford, Conn.).

Additionally, the stirred solution can be run through one or more strainer units disposed along the flow path of the stirred solution from the pump to the inlet of the chamber to filter out particulate material, debris, and fibers from the solution before it reaches the chamber. For example, as shown in FIG. 1, the solution 60 is run through a first strainer unit 80, constructed to filter out particles sized from about 30 microns to about 50 microns, more suitably about 40 microns, followed by a second strainer unit 82 downstream from the first strainer unit 80 constructed to filter out particles sized from about 5 microns to about 20 microns, more suitably about 15 microns. It is understood, however, that only one, or more than two strainer units may be used, or that the strainer units may be omitted altogether, without departing from the scope of this disclosure. Suitable strainer units for use in the ultrasonic treatment system of the present disclosure include, for example, strainer units produced by Cole-Parmer Instrument Company (Vernon Hills, Ill.).

Once the aqueous effluent is introduced into the ultrasonic treatment chamber of the ultrasonic treatment system, the aqueous effluent is contacted with the energized adsorbent. Specifically, as the aqueous effluent flows through the ultrasonic treatment system, compounds such as dyes and reactants in the aqueous effluent are adsorbed to the surface of the energized adsorbent.

Typically, the aqueous effluent is introduced into the ultrasonic treatment chamber at a flow rate of from about 100 milliliters/minute to about 20 liters/minute. More suitably, the aqueous effluent is introduced into the ultrasonic treatment chamber at a flow rate of from about 0.5 liters/minute to about 6 liters/minute. The aqueous effluent is then contacted with the energized adsorbent for a time period of from about 10 seconds to about 10 minutes. The aqueous effluent inside the ultrasonic treatment chamber typically has a temperature of from about 20° C. to about 90° C. and a pH of from about 2.0 to about 10.0.

After the compounds have been adsorbed to the energized adsorbent 100, the aqueous effluent 90, without the compounds, exits the ultrasonic treatment chamber 10 through an outlet end 38. The outlet end 38 is capable of letting the aqueous effluent 90, in which compounds have been removed, escape from the chamber 10, while providing enough flow resistance to keep the pressure within the chamber 10 at a suitable level. Typically, the pressure within the chamber 10 is maintained within a range of from about 1 pound/square inch (psi) to about 10 psi.

Figure 5A:
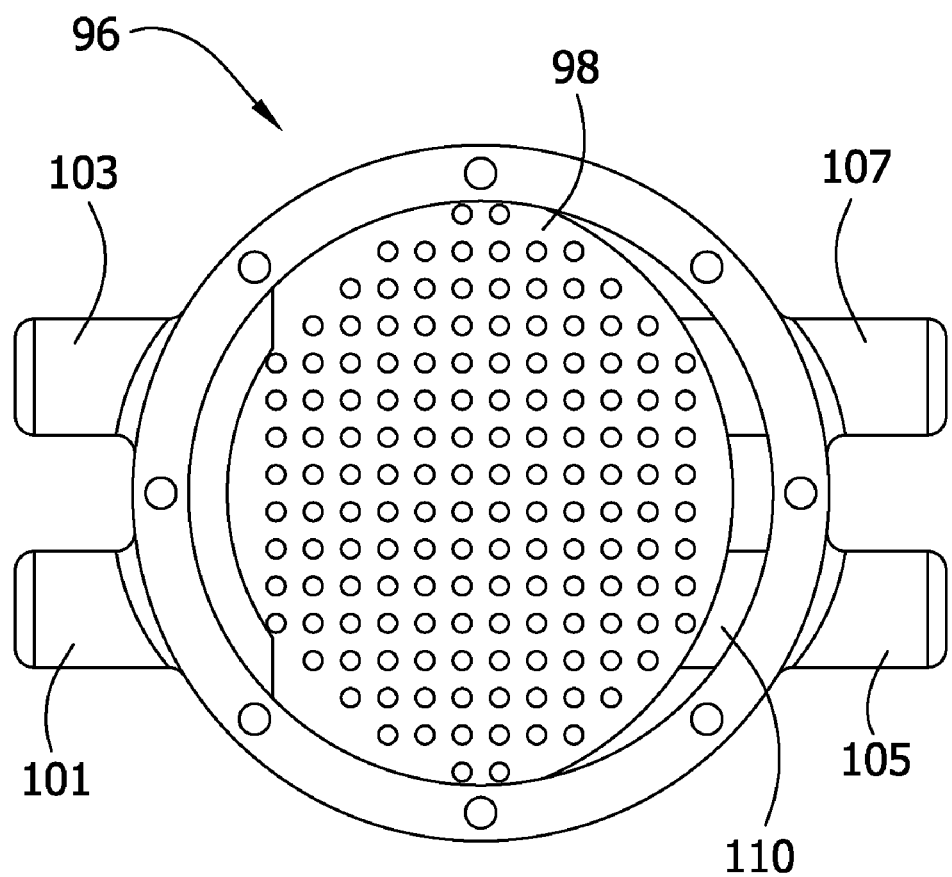
FIG. 5A is a top view of the tangential flow cap of FIG. 4.
Figure 5B:
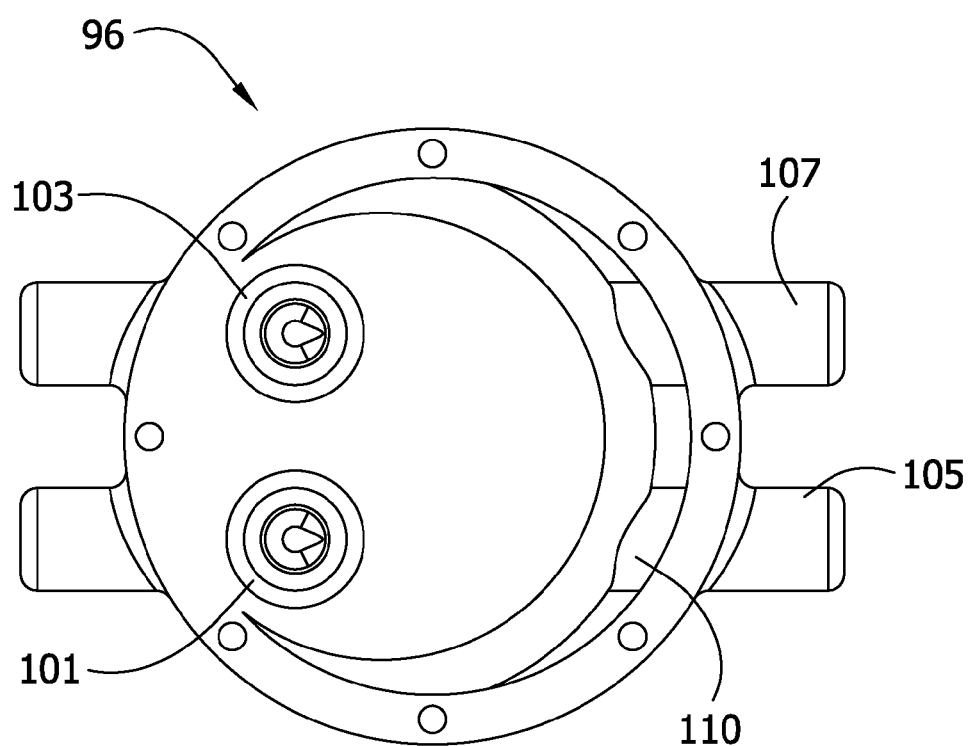
FIG. 5B is a bottom view of the tangential flow cap of FIG. 4.

In one particularly preferred embodiment, the ultrasonic treatment system 200 further comprises a tangential flow cap 96 located at the outlet end 38. As illustrated in FIGS. 5A and 5B, the tangential flow cap 96 includes a screen, generally indicated at 98, with outlet ports and at least one down port 101, more suitably at least two down ports 101 and 103, that extends from inside the ultrasonic treatment chamber 10 and turns 90° to exit the ultrasonic treatment chamber 10 from the side of the tangential flow cap 96. Additionally, the tangential flow cap 96 has at least one return port 105, more suitably at least two return ports 105 and 107, that extends from the side of the flow cap 96 and re-enters the chamber 10 through a moon-shaped hole 110. As the effluent continues along the flow path, a minor portion of the effluent exits the chamber through the screen, while a majority portion of the effluent flows up into the down ports and to a pump (not shown). The pump then forces the effluent into the return ports of the tangential flow cap, producing a tangential flow across the underside of the screen of the tangential flow cap. This tangential flow helps to prevent the energized adsorbent and any compounds removed from the aqueous effluent from sticking to the screen and clogging the outlet.

As depicted in FIGS. 2 and 4, when the ultrasonic treatment system includes the tangential flow cap 96, an end spacer 120 is disposed longitudinally between the tangential flow cap 96 and the column 14 of the ultrasonic treatment chamber 10. The end spacer 120 provides a space between the tangential flow cap 96 and the horn assembly 22 disposed within the ultrasonic treatment chamber 10. This open space above the horn assembly provides an area to permit the adsorbent to fluidize. The majority of the adsorbent will be located within this space where they undergo agitation from the horn assembly to facilitate the adsorption reaction.

In another embodiment, the outlet end 38 of the chamber 10 can include a fixed sintered woven wire mesh (not shown). Such a wire mesh has one or more outlet ports therethrough, with the number and diameter of the ports determined such that while pressurized solution may escape through the ports, the flow resistance created by the size of the ports is sufficient to retain a desired pressure inside the chamber. One suitable sintered woven wire mesh is a mesh with multiple ports, each port having an opening with a diameter of about 18 microns.

As noted above, many different types of aqueous effluent can be treated using the ultrasonic treatment system of the present disclosure. For example, in one embodiment, the aqueous effluent is a textile effluent. In another embodiment, the aqueous effluent is a beverage, such as fruit juice, wine, or beer. Other suitable aqueous effluents are described more fully above and include water such as, for example, drinking water, in rivers, streams, lakes, and the like.

Within these various aqueous effluents, different compounds can be removed using the above described processes. As described more fully above, compounds such as dyes, tannins, optical brighteners, sizing agents, enzymes, bleaching agents, surfactants, salts, lubricants, fire retardants, plasticizers, monomers such as acrylics, methyacrylics, acrylonitriles, initiators, acids such as acetic, ascorbic, citric, malic, and formic acids, alkali such as sodium carbonate, UV absorbers, yeast cells, phenols, proteins, microorganisms, suspended solids, dissolved organic matter, dissolved mineral matter, and combinations thereof can be removed.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the disclosure, it is intended that all matter contained in the above description and shown in the accompanying drawings shall be interpreted as illustrative and not in a limiting sense.

What is claimed is:

1. An ultrasonic treatment system for removing compounds from an aqueous effluent, the ultrasonic treatment system comprising an ultrasonic treatment chamber comprising an inlet end, an outlet end, a packed column of an adsorbent, and an ultrasonic waveguide assembly, wherein the ultrasonic waveguide assembly is a horn assembly comprising a horn member comprising two or more agitating members connected to the horn member and extending at least in part transversely outward from the outer surface of the horn member in longitudinally spaced relationship with each other, the agitating members and the horn member being constructed and arranged for dynamic motion of the agitating members relative to the horn member upon ultrasonic vibration of the horn member at a predetermined frequency and to operate in an ultrasonic cavitation mode of the agitating members corresponding to the predetermined frequency and the aqueous effluent flowing through the chamber.

2. The ultrasonic treatment system as set forth in claim 1 wherein the adsorbent is selected from the group consisting of alumina, silica, activated carbon, zeolites, and combinations thereof.

3. The ultrasonic treatment system as set forth in claim 2 wherein the adsorbent is alumina, the alumina being in the form of a particle selected from the group consisting of alumina particles and alumina covered particles.

4. The ultrasonic treatment system as set forth in claim 3 wherein the particles have a particle size of from about 5 nanometers to less than 500 microns.

5. The ultrasonic treatment system as set forth in claim 1 wherein the adsorbent is present to fill the packed column to an amount of from about 10% (by void volume) to about 90% (by void volume) of the column.

6. The ultrasonic treatment system as set forth in claim 1 wherein the ultrasonic waveguide assembly is excited at a frequency of from about 20,000 Hz to about 40,000 Hz.

7. The ultrasonic treatment system as set forth in claim 1 wherein the compounds to be removed are selected from the group consisting of dyes, tannins, optical brighteners, sizing agents, enzymes, bleaching agents, surfactants, salts, lubricants, fire retardants, plasticizers, acrylics, methacrylics, acrylonitriles, initiators, acids, sodium carbonate, UV absorbers, yeast cells, phenols, proteins, microorganisms, suspended solids, dissolved organic matter, dissolved mineral matter, and combinations thereof.

8. The ultrasonic treatment system as set forth in claim 1 wherein the aqueous effluent is a textile effluent.

9. The ultrasonic treatment system as set forth in claim 1 wherein the aqueous effluent is a beverage.

10. The ultrasonic treatment system as set forth in claim 1 wherein the aqueous effluent is water.

11. A process for removing compounds from an aqueous effluent, the process comprising:
packing a column of an ultrasonic treatment chamber of an ultrasonic treatment system with an adsorbent;
energizing the adsorbent in the column with ultrasonic energy produced by an ultrasonic waveguide assembly comprising a horn assembly disposed entirely within the ultrasonic treatment chamber of the ultrasonic treatment system, the horn assembly comprising a horn member comprising two or more agitating members connected to the horn member and extending at least in part transversely outward from the outer surface of the horn member in longitudinally spaced relationship with each other, the agitating members and the horn member being constructed and arranged for dynamic motion of the agitating members relative to the horn member upon ultrasonic vibration of the horn member at a predetermined frequency and to operate in an ultrasonic cavitation mode of the agitating members corresponding to the predetermined frequency and the aqueous effluent flowing through the chamber;
introducing an aqueous effluent through an inlet end of the ultrasonic treatment chamber of the ultrasonic treatment system; and
contacting the aqueous effluent with the energized adsorbent.

12. The process as set forth in claim 11 wherein the column is packed with adsorbent in an amount to fill the column from about 10% (by void volume) to about 90% (by void volume).

13. The process as set forth in claim 11 wherein the adsorbent is selected from the group consisting of alumina, silica, activated carbon, zeolites, and combinations thereof.

14. The process as set forth in claim 13 wherein the adsorbent is alumina, the alumina being in the form of a particle selected from the group consisting of alumina particles and alumina covered particles.

15. The process as set forth in claim 14 wherein the particles have a particle size of from about 5 nanometers to less than 500 microns.

16. The process as set forth in claim 11 wherein the ultrasonic waveguide assembly is excited at a frequency of from about 20,000 Hz to about 40,000 Hz.

17. The process as set forth in claim 11 wherein the horn assembly comprises an elongated, cylindrical horn member.

18. The process as set forth in claim 11 wherein the aqueous effluent is reacted with the energized adsorbent for a period of from about 10 seconds to about 10 minutes.

19. The process as set forth in claim 11 wherein the aqueous effluent is introduced through the inlet of the chamber of the ultrasonic treatment system at a flow rate of from about 100 milliliters/minute to about 20 liters/minute.

20. The process as set forth in claim 11 wherein the aqueous effluent is a textile effluent.

21. The process as set forth in claim 11 wherein the aqueous effluent is a beverage.

22. The process as set forth in claim 11 wherein the aqueous effluent is water.

23. The process as set forth in claim 11 wherein the compound to be removed is selected from the group consisting of dyes, tannins, optical brighteners, sizing agents, enzymes, bleaching agents, surfactants, salts, lubricants, fire retardants, plasticizers, acrylics, methacrylics, acrylonitriles, initiators, acids, sodium carbonate, UV absorbers, yeast cells, phenols, proteins, microorganisms, suspended solids, dissolved organic matter, dissolved mineral matter, and combinations thereof.

24. An ultrasonic treatment chamber for removing compounds from an aqueous effluent using an ultrasonically energized adsorbent, the treatment chamber comprising:

an elongate column having longitudinally opposite ends and an interior space, wherein the interior space is packed with ultrasonically energized adsorbent, the column being generally closed at the longitudinal ends and having an inlet end for introducing aqueous effluent into the interior space of the column and an outlet end through which aqueous effluent exits from the column following adsorption of compounds by the ultrasonic energized adsorbent, the outlet end being spaced longitudinally from the inlet end such that aqueous effluent flows longitudinally within the interior space of the column from the inlet end to the outlet end, and an elongate ultrasonic waveguide assembly extending longitudinally within the interior space of the column and being operable at a predetermined ultrasonic frequency to ultrasonically energize the adsorbent, the waveguide assembly comprising an elongate ultrasonic horn member disposed at least in part intermediate the inlet end and the outlet end of the column and having an outer surface located for contact with aqueous effluent flowing within the column from the inlet end to the outlet end, and a plurality of agitating members in contact with and extending transversely outward from the outer surface of the horn member intermediate the inlet end and the outlet end in longitudinally spaced relationship with each other, the agitating members and the horn member being constructed and arranged for dynamic motion of the agitating members relative to the horn member upon ultrasonic vibration of the horn member at a predetermined frequency and to operate in an ultrasonic cavitation mode of the agitating members corresponding to the predetermined frequency and the aqueous effluent flowing through the chamber.

25. The ultrasonic treatment chamber as set forth in claim 24 wherein the predetermined frequency is in the range of about 20,000 Hz to about 40,000 Hz.

26. The ultrasonic treatment chamber as set forth in claim 24 wherein the agitating members and the horn member are constructed and arranged to amplify the displacement of at least one of the agitating members relative to the displacement of the horn member upon ultrasonic vibration of the horn member at the predetermined frequency.

27. The ultrasonic treatment chamber as set forth in claim 24 wherein the horn member and agitating members together define a horn assembly of the waveguide assembly, the horn assembly being disposed entirely within the interior space of the housing.

28. The ultrasonic treatment chamber as set forth in claim 24 wherein the outlet end further comprises a tangential flow cap, wherein the tangential flow cap comprises a screen, at least one down port that extends from inside the ultrasonic treatment chamber and turns 90° to exit the ultrasonic treatment chamber from the side of the tangential flow cap, and at least one return ports that extends from the side of the tangential flow cap and re-enters the ultrasonic treatment chamber through a hole in the tangential flow cap.

29. The ultrasonic treatment chamber as set forth in claim 28 wherein the ultrasonic treatment chamber further comprises an end spacer disposed longitudinally between the tangential flow cap and the elongate column to permit energized adsorbent flowing downstream to fluidize prior to the aqueous effluent exiting the column at the outlet end.

30. The ultrasonic treatment chamber as set forth in claim 24 further comprising a mounting member for mounting the waveguide assembly on the column generally at one of the longitudinal ends thereof, the mounting member being constructed to substantially vibrationally isolate the column from the waveguide assembly.

31. The ultrasonic treatment chamber as set forth in claim 30 wherein the mounting member at least in part closes one of the longitudinal ends of the column.

32. The ultrasonic treatment chamber as set forth in claim 30 wherein the mounting member is formed integrally with the waveguide assembly.

33. The ultrasonic treatment chamber as set forth in claim 24 wherein at least one of the agitating members extends continuously about the circumference of the horn member.

34. The ultrasonic treatment chamber as set forth in claim 24 wherein each of the agitating members extends continuously about the circumference of the horn member.

35. The ultrasonic treatment chamber as set forth in claim 24 wherein each of the agitating members has a transverse length that the agitating member extends transversely outward from the outer surface of the horn member, and a thickness, a ratio of the agitating member length to agitating member thickness being in the range of about 2:1 to about 6:1.

36. The ultrasonic treatment chamber as set forth in claim 24 wherein the inlet end comprises an inlet port oriented generally tangentially relative to the column to induce a swirling action to the aqueous effluent delivered into the interior space of the column at the inlet end.

37. The ultrasonic treatment chamber as set forth in claim 36 wherein the inlet port is an outer inlet port, the ultrasonic treatment chamber further comprising an inner inlet port oriented generally tangentially relative to the column in parallel, spaced alignment with the outer inlet port.

* * * * *